(12) United States Patent
Dayan et al.

(10) Patent No.: US 6,487,465 B1
(45) Date of Patent: Nov. 26, 2002

(54) METHOD AND SYSTEM FOR IMPROVED COMPUTER SECURITY DURING ROM SCAN

(75) Inventors: Richard Alan Dayan, Wake Forest, NC (US); Robert Duane Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,728

(22) Filed: Nov. 1, 1999

(51) Int. Cl.[7] .................................. G05B 9/02
(52) U.S. Cl. .................. 700/81; 700/21; 700/78; 700/79; 700/80; 700/82; 700/87; 713/300; 713/200; 713/202; 713/323; 713/324; 713/310; 382/115; 382/116; 382/124
(58) Field of Search ................. 700/2–5, 21, 22, 700/78, 79, 80, 81, 82, 86, 87, 88, 89; 713/100, 200, 202, 300, 323, 324, 320–322, 310; 340/5–7.4, 5.8–5.81, 995; 382/116, 124, 115

(56) References Cited

U.S. PATENT DOCUMENTS

| | | | | |
|---|---|---|---|---|
| 4,727,476 A | | 2/1988 | Rouchon ................. 364/380 |
| 5,022,077 A | * | 6/1991 | Bealkowski et al. ....... 340/5.74 |
| 5,187,792 A | * | 2/1993 | Dayan et al. ............. 711/118 |
| 5,388,156 A | * | 2/1995 | Blackledge et al. .......... 380/52 |
| 5,410,707 A | * | 4/1995 | Bell ........................... 711/115 |
| 5,634,137 A | * | 5/1997 | Merkin et al. ................ 710/10 |
| 5,724,027 A | * | 3/1998 | Shipman et al. .......... 235/382 |
| 5,742,758 A | * | 4/1998 | Dunham et al. ............ 713/200 |
| 6,098,171 A | * | 8/2000 | Johnson et al. ............. 713/200 |

OTHER PUBLICATIONS

PC Magazine, v10, n22, p. 66, Dec. 31, 1991, "DOS menu system adds software–based security", N Zelnick.
PC Sources, v2, n7, p. 307, Jul. 1991, "Virus protection", B Brenesal.

* cited by examiner

Primary Examiner—Ramesh Patel
(74) Attorney, Agent, or Firm—J. Bruce Schelkopf; John David Flynn

(57) ABSTRACT

A system and method of improving security during power-on-self-test (POST), particularly the ROM scan portion identifying ROM adapters, while selectively allowing user input. While a user input during ROM scan may be normally locked out to prevent the user from making changes to the configuration of the system, when the ROM scan during POST detects a ROM adapter which uses an input from the user, the system can override the lockout and allows for a user input. An optional control, such as a password or other personal identifier, can provide security, allowing the user input only when the user is authorized to provide the input (in response to an appropriate password or personal identifier such as a biometric identifier).

8 Claims, 4 Drawing Sheets

| OFFSET | LENGTH | VALUE | DESCRIPTION |
|--------|--------|-------|-------------|
| 0h | 2h | AA55h | Signature |
| 2h | 1h | varies | Option ROM Lenth |
| 3h | 4h | varies | initialization vector |
| 7h | 13h | varies | reserved |
| 1Ah | 2h | varies | offset to expansion |
| 1Ch | 2h | 88DDh | security signature |
| 1Eh | 4h | varies | security vector |

METHOD AND SYSTEM FOR IMPROVED COMPUTER SECURITY DURING ROM SCAN

CROSS REFERENCE TO RELATED PATENTS

The present invention is related to U.S. patent application Ser. No. 09/052,733 entitled "Personal Computer ROM Scan Startup Protection" now U.S. Pat. No. 6,098,071, filed Mar. 31, 1998 by Robert Duane Johnson, Randall Scott Springfield, Joseph Wayne Freeman and Ralph Bonomo as inventors and assigned to the assignee of the present invention. The disclosure of this patent, which is sometimes referred to herein as the ROM Scan Patent, is hereby specifically incorporated into this document by reference.

BACKGROUND OF THE INVENTION

1. Field of the Invention

The present invention relates to improvements in security for a computer. More particularly, the present invention is an improved system and method for a personal computer during the startup process when scanning ROM by selectively allowing an input from a user.

2. Background Art

Personal computers are well known in the art for providing a variety of data processing applications. Such personal computers usually include various input and output devices connected to a processor with an operating system stored in memory of the personal computer. The system includes a power-on-self test (POST) operable when the computer is first turned on to verify the presence and operating condition of the various input and output devices connected to the processor. During the POST, certain blocks of memory address space are scanned for the presence of one (or more) block of code known as an adapter ROM (other memory technologies such as Flash as it is known in the state of the art may be used instead of ROM) used in attaching certain peripheral devices and setting them up with the appropriate initial conditions. If such an adapter ROM is found within the address memory space, then this adapter ROM performs initialization and configuration routines, a process which is often referred to as "ROM scan". During the ROM scan, sensitive areas of memory (storing configuration information) in the computer are accessible for storing data as a result of the ROM scan. Since these memory areas are also involved in the security aspects of the personal computer, it is important that user inputs be controlled to avoid improper activity such as would defeat the security features which have been designed into the operating system (and its power-on-self-test) of the personal computer.

The ROM Scan Patent teaches that it is desirable to keep the user of a personal computer from making inputs at a keyboard or other input devices (such as a mouse) during the ROM scan process and the POST generally, and this is accomplished by locking the keyboard and other input devices out during the ROM Scan operation of the POST.

However, there are some ROM adapters which either encourage or require a user input during the ROM scan process and initial setup, and the functions provided in the ROM Scan Patent would preclude such inputs. Hence, the prior art systems either had security against user inputs during the ROM scan (as provided in the ROM Scan Patent) but prevented user inputs of the type desirable in some ROM adapters or allowed the user inputs during the ROM scan but did not provide security against inappropriate user input which could defeat security aspects present in the configuration information during the ROM scan process.

Accordingly, the prior art systems have undesirable limitations and disadvantages.

SUMMARY OF THE INVENTION

The present invention overcomes the disadvantages and limitations of the prior art systems by providing a system which selectively allows user inputs during the ROM scan process. In this way, the protection of the ROM Scan Patent preventing user inputs is usually in effect, but, in those cases where a user input is desirable or necessary, enabling such an input.

In this way, input devices such as the keyboard are normally locked out during ROM scan, but input is permitted when it is desirable to have such an input and the user has the authority to do so. Since some ROM adapter code stored in memory either requires a user input during startup or otherwise permits such an input, it would be desirable to allow such inputs when needed, while otherwise preventing the user inputs. The authorization to make changes can be limited to those individuals authorized to make changes to the system's configuration through the use of appropriate privilege access password or administrator password.

The present invention has the advantage that it is simple to implement and effective to normally prevent user inputs during power-on-self-test including the ROM scan, but to allow an input from the user to be made and recorded in memory when desirable.

The present invention allows the security of a lockout during power-on-self-test and yet allows use of ROM adapters which require a user input during startup. Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Some of the objects and advantages of the present invention having been set forth above, other objects will appear as the description of the present invention proceeds, with the present invention being an improved computer security system and method in which.

DETAILED DESCRIPTION OF THE PREFERRED EMBODIMENT

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures while still obtaining the favorable results of the invention.

Figure 1:
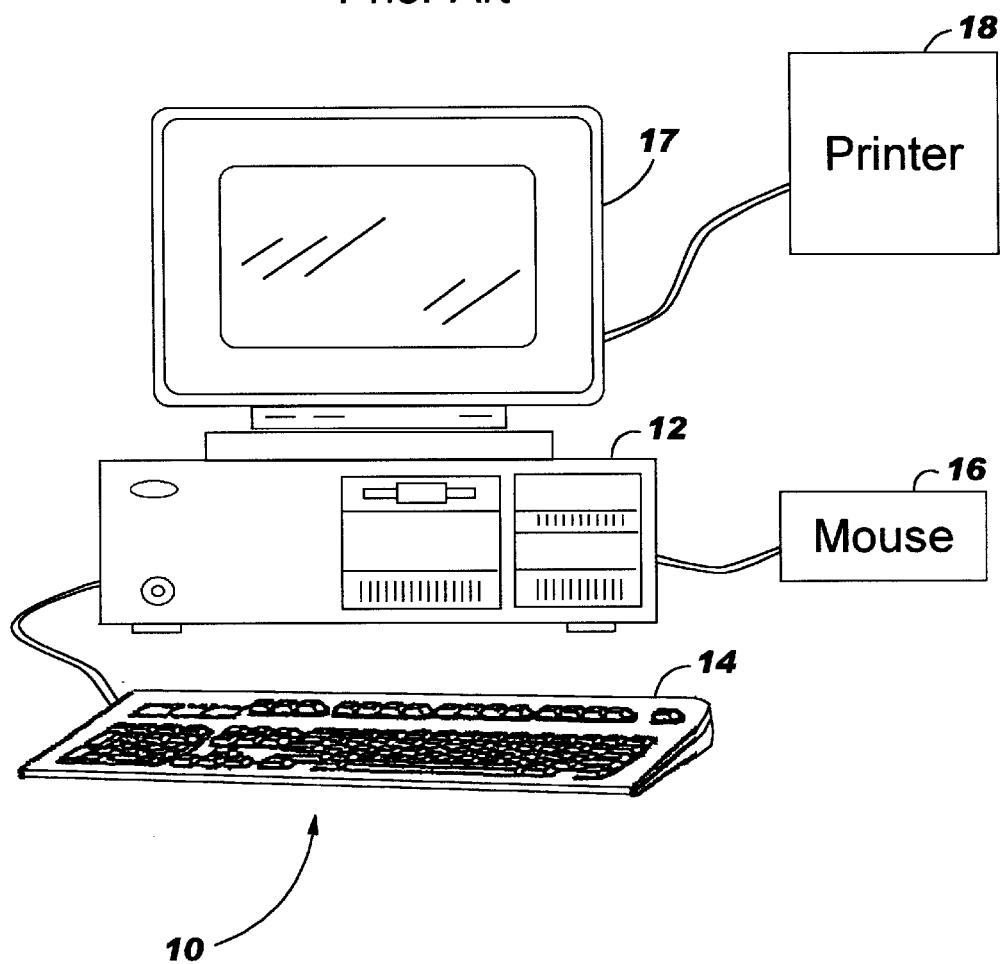
FIG. 1 is a pictorial diagram of a personal computer useful in practicing the present invention.
Figure 2:
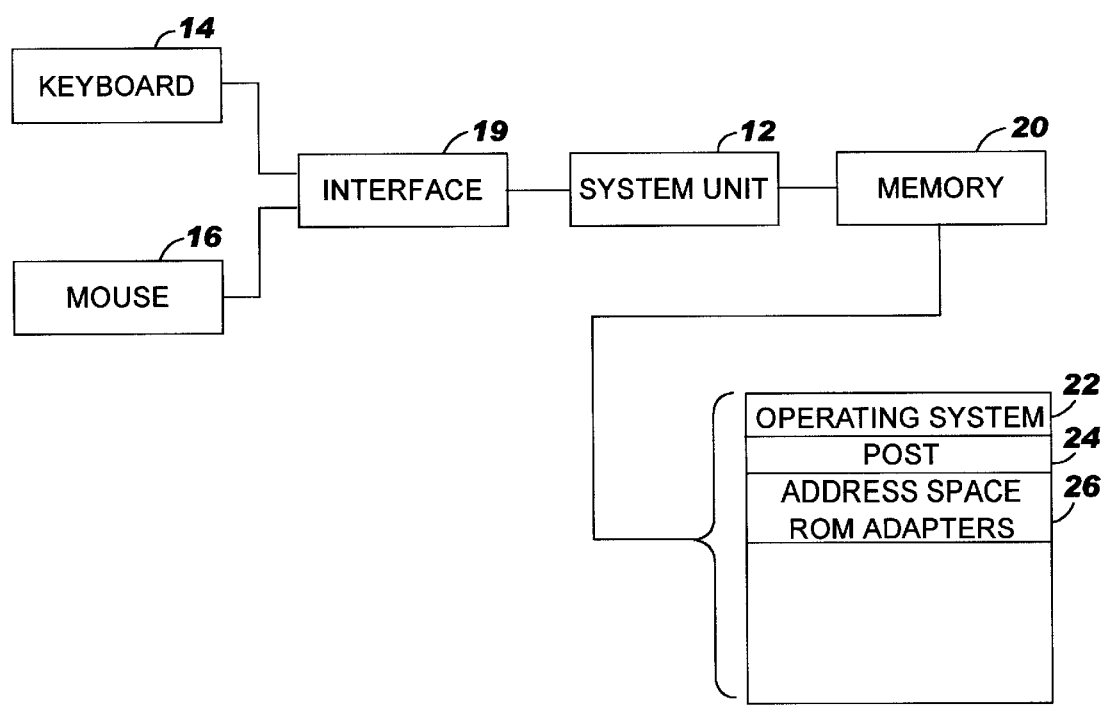
FIG. 2 is a block diagram of the personal computer of FIG. 1 and provides a logical diagram of the memory of the personal computer, showing selected portions of the data stored in the memory of the personal computer.

FIG. 1 is a pictorial view of a personal computer 10 useful in practicing the present invention. The personal computer 10 includes a system unit 12 connected to a keyboard 14 and a mouse 16 as well as an output device such as display 17 and printer 18. The keyboard 14 and the mouse 16 are input devices through which the user can enter inputs and the display 17 and printer 18 are examples of a peripheral or output device through which the results of the computer can be transmitted. A variety of other peripheral devices for input or output may be connected to the personal computer in a variety of conventional ways, such as plugging cards into slots within the system unit, attaching to ports and buses such as a modem, a serial bus, a parallel port or a USB port. A variety of devices can be connected to the personal computer in this way, and many of these devices use code known as ROM adapter code that is stored in memory of the system unit 12. The various ROM adapter codes are sometimes referred to as ROM adapters. The ROM adapters are used during initial setup to configure the personal computer during a process referred to as ROM scan which is more specifically described in connection with prior art such as the ROM Scan Patent. FIG. 2 is a schematic view of the personal computer 10 of FIG. 1. In this FIG. 2, the keyboard 14 and the mouse 16 are connected to the system unit 12 through an input interface 19. The system unit includes a memory 20 which stores an operating system 22, a power-on-self-test 24 and address memory space in which ROM adapters 26 are stored. The ROM adapters 26 are blocks of code stored within the address memory space and relate to peripheral devices which may be connected to the system unit 12 and allow for initial conditions to be established within the personal computer 10 during power-on-self-test. Some of these ROM adapters are stored in complete form and load data into the memory during the power-on-self-test, but other ROM adapters can use an input from the user at an input device such as the keyboard 14.

Figure 3:
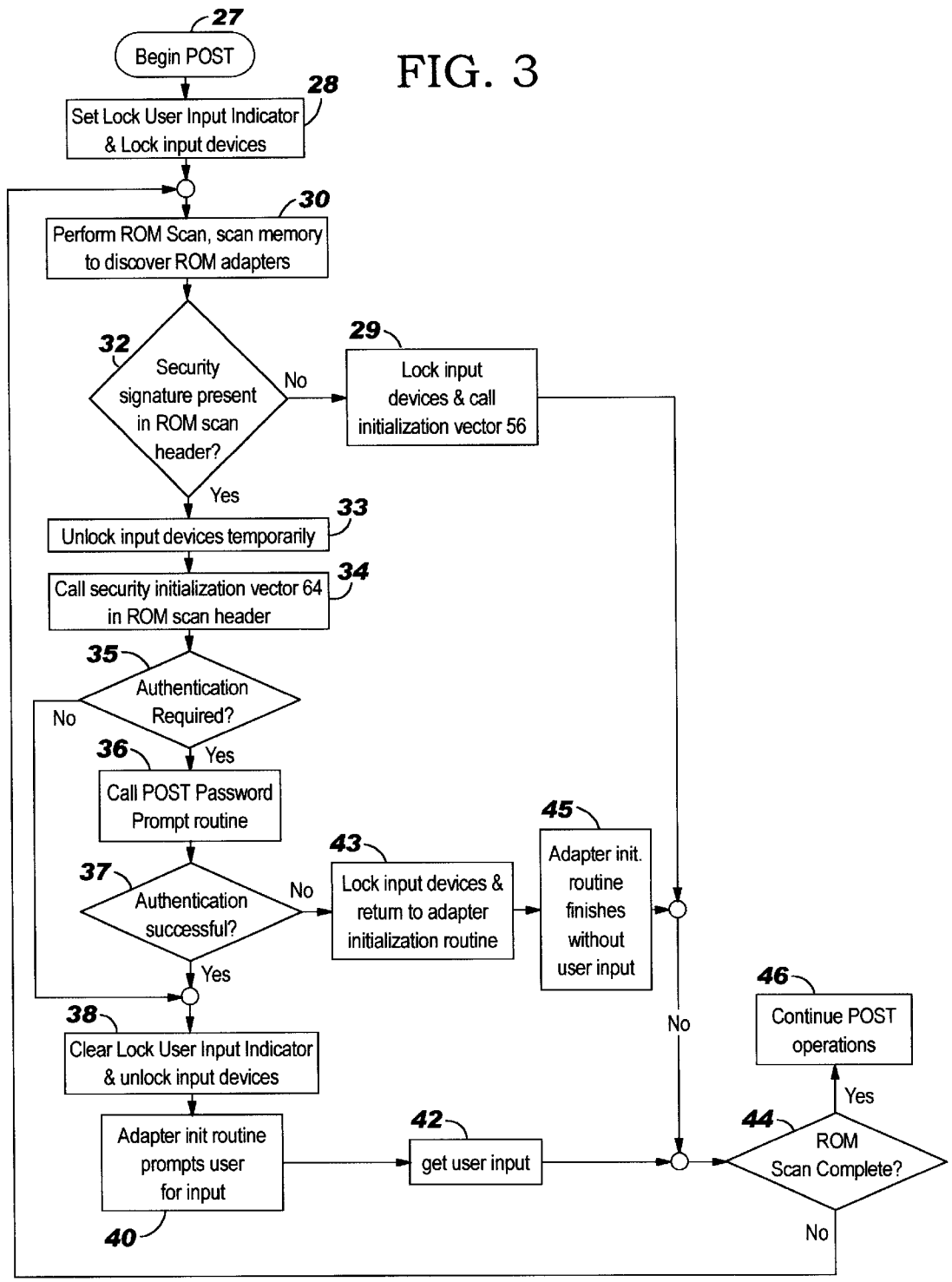
FIG. 3 is a logical flow for a part of the power-on-self-test processing of the personal computer of the present invention.

FIG. 3 illustrates logic for a portion of the power-on-self-test relating to the present invention. In block 27 the power on self test process begins and at block 28 the flag is set to prevent user inputs during the power-on-self-test and the input devices are disabled, as taught in the ROM Scan Patent. At block 30, the memory is scanned for a ROM adapter. When a ROM adapter is located in memory, then the ROM adapter is tested for whether a security signature 62 is present at block 32. If no security signature 62 is present, POST locks the input devices and then invokes the ROM adapter initialization vector 56 in block 29. The ROM scan process continues in block 44. If the ROM adapter has a security signature 62 the adapter ROM Security vector 64 is invoked with the input devices temporarily unlocked. The adapter ROM determines if user input is required in block 34 then at block 35 the adaptor ROM determines whether it requires a password or other authorization. In Block 36, if an authorization is required to provide a user input, then at block 37 the password or other authorization is tested to determine that the user is authorized; if not, at block 43, POST locks the input devices and the adapter continues to perform initialization without user input. At step 44 ROM Scan process continues. If the user successfully provides the authorization or password, or if no authorization is required, then at block 38 the flag preventing the user inputs is cleared and the user is allowed to provide inputs, allowing the setup of the ROM adapter which requires a user input. At block 42 the user input is provided. If the ROM scan is not complete at block 44, then control returns to the block 30 where the presence of another ROM adapter is sought until the entire block of memory is scanned for ROM adapters. At block 44 if ROM scan is complete, all of memory is searched, then POST continues its normal operation at block 46.

As taught in the ROM Scan Patent, a ROM adapter will have an indication or signature that it is a ROM adapter (such preset value as the hexadecimal value AA55 in a ROM scan header, as specified in the Plug and Play BIOS specification used in the industry) as opposed to other forms of data and programs which may be stored in memory so it can be identified as such during the POST. Again, as taught in the ROM Scan patent, the lock out of the input devices can be accomplished in any appropriate fashion, as by temporarily disabling the connection between the input device and the system unit through the input interface 19. Alternatively, the input device could be disabled or locked out through other mechanisms such as software or hardware features disregarding the inputs during the power-on-self-test.

Typically, the ROM scan (seeking ROM adapters in block 30) is performed throughout a specified subset of the memory address space of the personal computer 101 typically 0C0000 through 0DFFFF (hexadecimal) and is scanned at some granularity such as every 512 bytes, but not in between, looking for the signature of a ROM adapter header, such as the hexadecimal AA55.

Figures 4, 5:
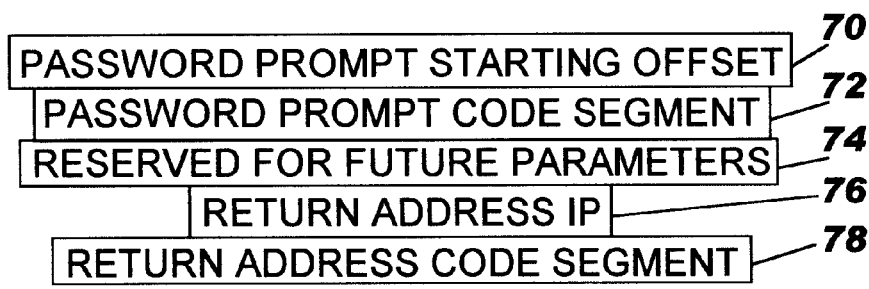
FIG. 4 is a representation of a ROM adapter format useful in the present invention.
FIG. 5 is a representation of parameters passed on stack to a password checking routine.

As shown in FIG. 4, a ROM header useful in practicing the present invention is shown. In this illustration, the ROM header 50 includes seven fields, a signature field 52, a run length field 54, an initialization vector 56, a reserved field 58, an offset to expansion header 60, a security signature field 62 and a security convention initialization vector 64. The last two fields are expansions to the standard option ROM header from the Plug and Play BIOS Specification and facilitate the present invention.

As shown in FIG. 5 the format of the stack as passed to the Security initialization routine of the adapter is shown when the security requires the user to enter a password in order to be authorized to make an input during ROM scan. This preferably used in a system with an Intel X86 compatible microprocessor but may be adopted by those skilled in the art to another microprocessor architecture. The security signature field 62 is set to a selected value (hexadecimal 88DD) to indicate that password security is required prior to ROM scan process. Then, the address in the field 64 is used to address the security initialization routine in the ROM which will prompt the user to see if input is required. POST sets up the stack as in FIG. 5 prior to calling the routine in the initialization vector 64. The block 70 indicates the POST password prompt routine starting offset. Block 72, contains the POST password prompt routine code segment address. Block 74 is reserved for return parameters and block 76 is for the return address IP, while block 78 is for return address code segment. The POST password prompt routine will prompt for the PAP or AP, as appropriate, and return to the adapter's initialization routine indicating whether the password was correctly entered or not, comparing it to a value stored in the memory representative of the correct password, using a conventional system for password checking. If the password was not correctly entered, the keyboard and other input device will be disabled for the remainder of the ROM adapter's initialization. If the password was correctly entered, then the password checking routine will return with a successfully entered indicator and the keyboard and pointing device interfaces 19 will be enabled for the remainder of the initialization of the ROM adapter.

Of course, many modifications of the present invention will be apparent to those skilled in the relevant art in view of the foregoing description of the preferred embodiment, taken together with the accompanying drawings. For example, an optional security device has been described in connection with a password for identity verification or authentication, while it is known that other personal identifiers such as fingerprint, retina scan, signature or hand geometry, could be used to advantage to authenticate an individual who is authorized to make entries. The invention has been described in connection with the functions to be performed and the tests to be accomplished, many of which will be performed by stored programs in the computer, programs which can be designed according to the requirements of the operating system and the designer's preference, but the specifics of which are not a part of the present invention. Further, the system has been disclosed in connection with ROM adapters or other blocks of code which require input during the power-on-self-test, while the present system could be used to advantage with other inputs and at other times when an input would normally be locked out, but to selectively permit an input from a user. Many other variations on the system disclosed could be employed without departing from the spirit of the present invention. Additionally, some of the aspects of the present invention can be used to advantage without the corresponding use of other features. Accordingly, the foregoing description of the preferred embodiment should be considered as merely illustrative of the principles of the present invention and not in limitation thereof.

Having thus described the invention, what is claimed is:

1. A computer system having a processor, a memory address space and a stored program including a power-on-self-test in the memory address space comprising:

an input device operatively connected to the processor;

an adapter ROM located in certain blocks of the memory address space;

a control associated with the power-on-self-test for preventing an input from the input device during the power-on-self-test to prevent user inputs from entering the memory;

a security signature in said adapter ROM for identifying said adapter selectively accepts user input;

a ROM security routine for determining if user input is required and further including a test for user authorization; and an indicator stored in the memory for permitting a user input during at least a portion of the power-on-self-test, with the processor responding to the indicator and allowing a user input at the input device during power-on-self-test by at least temporarily overriding the control preventing a user input during the power-on-self-test if the user successfully satisfies the authorization test.

2. The computer system of the type described in claim 1 wherein the test for user authorization is the entry of a password which is compared with an authorized password stored in memory.

3. The computer system of the type described in claim 1 wherein the test for user authorization is a biometric indicator of personal identity.

4. The computer system of the type described in claim 1 where if the user fails to satisfies the authorization test the user's input device are blocked from memory.

5. A method of operating a computer system with a memory address space and having an input device connected to the computer system, the method including the steps of:

initiating a power-on-self-test when the computer system is turned on;

initially locking out the input device from affecting the memory during the power-on-self-test;

performing a ROM Scan in a specified portion of the memory address space for locating a ROM Scan Header;

sensing a security signature in a ROM adapter header stored in said memory that a user input is desirable during the power-on-self-test;

overriding the lockout of the input device after an authorization test; and allowing authorized user input during at least a portion of the power-on-self-test.

6. The method of operating a computer system including the steps of claim 5 wherein the step of requiring user authentication includes the steps of the user providing a password and comparing the password with a list of passwords stored in memory and authorized to make an input during ROM scan and allowing the user input to affect memory only if the comparing is successful.

7. The method of operating a computer system of the type set forth in claim 5 wherein the step of authenticating the user includes the step of the user providing a biometric identification which is compared with a stored biometric identification to determine that the user is authorized to make inputs during the power-on-self-test.

8. The method of operating a computer system of the type set forth in claim 5 further comprising the step:

blocking user inputs from said input device if the authorization step fails.

* * * * *